United States Patent [19]
Neece

[11] 3,844,372
[45] Oct. 29, 1974

[54] AUTOMATICALLY GUIDED TRACTOR

[76] Inventor: Delbert M. Neece, RFD 1, Gardner, Ill. 60424

[22] Filed: Dec. 13, 1973

[21] Appl. No.: 424,429

[52] U.S. Cl............... 180/79.1, 172/26, 280/87.2, 104/244.1
[51] Int. Cl............................................. B62d 1/26
[58] Field of Search.......... 180/79, 79.1, 79.2 R, 98, 180/97, 6.5; 172/26, 6; 280/87.2; 104/244.1

[56] References Cited
UNITED STATES PATENTS

| | | | |
|---|---|---|---|
| 3,402,784 | 9/1968 | Roberson et al..................... | 180/79 |
| 3,537,531 | 11/1970 | Fischer................................ | 172/26 |
| 3,581,838 | 6/1971 | Rhodes............................... | 180/79 |
| 3,797,602 | 3/1974 | Sumida.............................. | 180/79.1 |

*Primary Examiner*—David Schonberg
*Assistant Examiner*—Jack D. Rubenstein
*Attorney, Agent, or Firm*—Kenneth T. Snow

[57] ABSTRACT

A device to automatically and mechanically guide an agricultural tractor along a field row independently of the operator. The device utilizes a field defined row, such as a precut trench or some other physical means, to cooperate with a feeler element of the device. The feeler element is caused to swing laterally to either side when the tractor gets out of alignment with the defined row. Cooperative electro-magnetic means are provided on the device carried on the tractor which are actuated by swinging movement of the feeler element to call for the regular power steering mechanism to automatically make corrections to the steering of the tractor in either direction depending on the direction of swinging of the feeler element. Linkage is provided to automatically return the electro-magnetic means to proper alignment to avoid over-steering correction.

7 Claims, 5 Drawing Figures

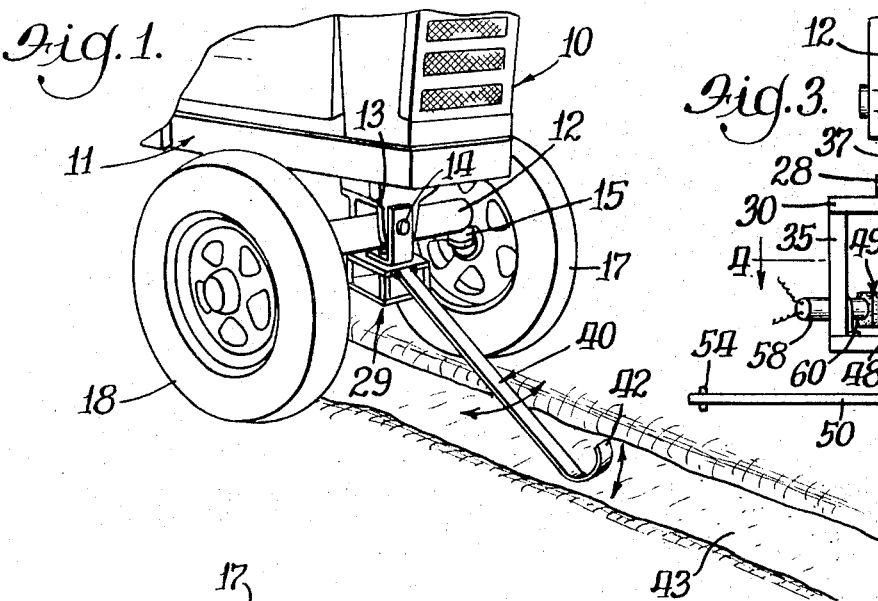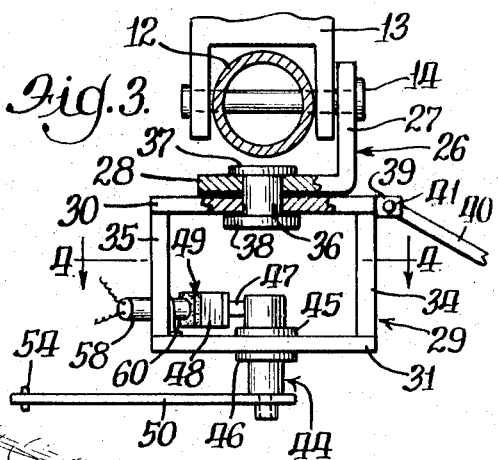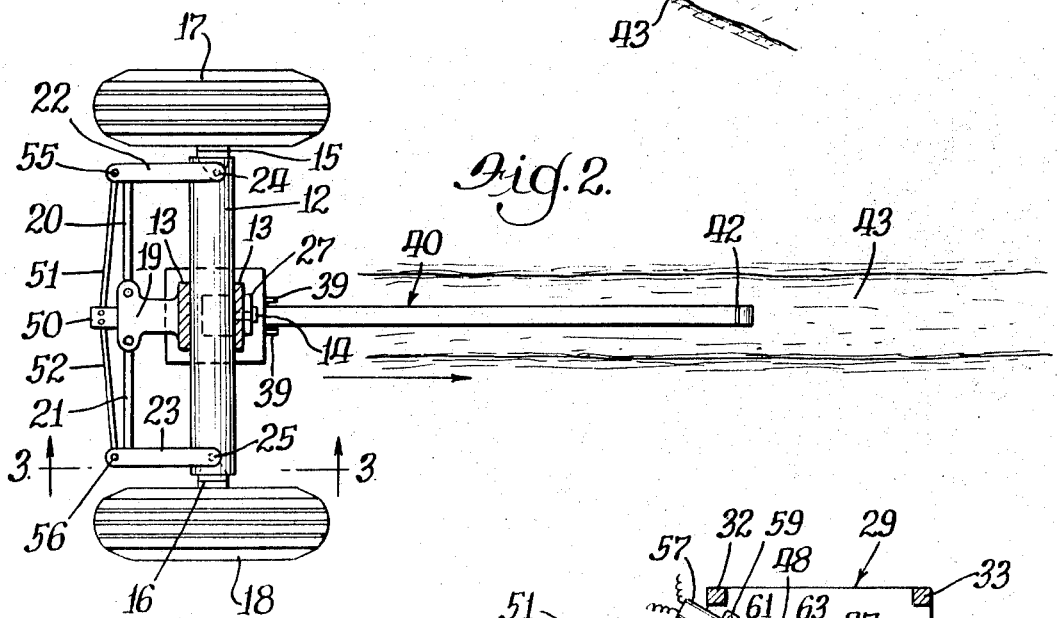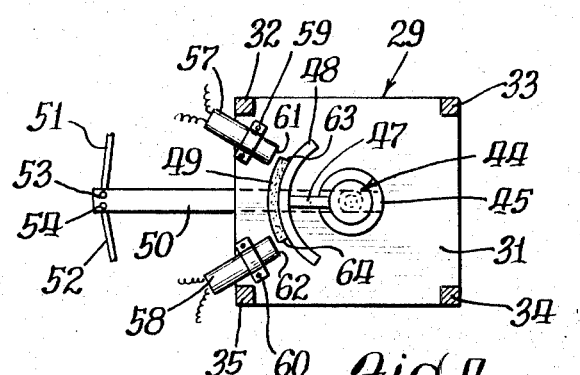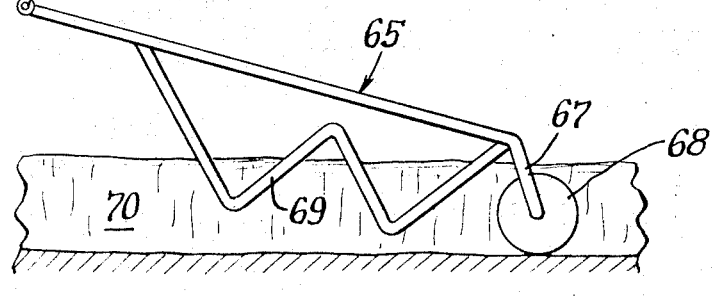

AUTOMATICALLY GUIDED TRACTOR

BACKGROUND OF THE INVENTION

1. Field of the Invention

There have been two developments in the field of agriculture which have contributed to the present invention. These have been the building of larger machines for the tilling, planting, cultivating and harvesting of crops, and the building of larger tractors to accommodate the larger machines to be mounted on or pulled by the tractors. Coupled with the largeness of the tractors has been a sophistication of the tractors. The early tractors were designed just for pulling implements in a manner to replace the draft animals previously used.

Present day tractors have complex hydraulic systems which are used for many purposes both on the tractor and the implement carried by the tractor. One such use is for the power steering of the very heavy tractor. Another tractor change is in its speeds - these have been raised substantially. The small farms of the past are fast disappearing and in their place are the large farms or ranches which are made up of many small farms. The large farms are often operated by corporations rather than individuals and the persons actually using the tractors and implements are employees. Despite the tractor improvements the driving of such tractors is very fatiguing. This is especially true when the operation requires accurate traversing of a field either for planting, cultivating or harvesting a crop.

It is with this background that applicant has developed and invented a device to assist the tractor driver with a guidance system and to thereby relieve the driver from the fatiguing task of keeping the tractor on line and properly guided over a field.

2. Description of the Prior Art

The inventor has surveyed the market for a device to assist a tractor operator in the steering or guiding of a tractor and has been unable to find any such existing device.

A search was made of prior patented devices and there have been numerous patents which have addressed themselves to guidance systems for tractors. The most pertinent were believed to be the following:

| | |
|---|---|
| Poll | 1,723,073 |
| Thiemann | 1,939,472 |
| Jenkins | 2,496,727 |
| Goodwine, Jr. | 2,509,914 |
| Sieling | 3,118,505 |
| Sieling | 3,123,148 |
| Roberson et al | 3,402,784 |
| Fischer et al | 3,537,531 |

All of the above identified patents show various devices for automatically steering tractors, particularly tractors of the agricultural type, in response to actuation of some feeler means which may be either ground engaging, furrow or trench engaging, or crop engaging. All types of power have been employed to effect steering - mechanical, electrical and hydraulic. The feelers or sensing devices described include runners and wheels. However, despite all this prior patent art no such operable device can be found on the market. The reason for there being no commercial devices appears to be the fact there has been no good way to prevent overcorrection of the steerable wheels or to avoid a hunting and seeking of a hydraulic system which means the steerable wheels of the tractor would be constantly going back and forth. The present invention is believed to eliminate hydraulic surging and over corrected steering.

SUMMARY OF THE INVENTION

A principal object of this invention is to provide a novel means for assisting in the guiding of a tractor without any hunting and seeking of a hydraulic system and without over correcting the steering to bring the tractor back into alignment with the row over which it is desired to travel.

An important object of the present invention is to provide novel cooperative feeler means for automatically guiding an implement carrying tractor over a predetermined path.

Another important object of this invention is to provide a novel electro-magnetic control means for a tractor guidance system.

Other and further important objects and advantages will become apparent from the disclosures in the following specification and accompanying drawings.

IN THE DRAWINGS

FIG. 1 is a perspective view of a portion of an agricultural tractor having the steering mechanism of this invention mounted thereon.

FIG. 2 is a top plan view partially in section of the steering mechanism as depicted in FIG. 1.

FIG. 3 is an enlarged sectional view detail of the steering assist mechanism as taken on the line 3—3 of FIG. 2.

FIG. 4 is a sectional view taken on the line 4—4 of FIG. 3.

FIG. 5 is a side elevational view of a modified form of feeler member for the device of this invention.

AS SHOWN IN THE DRAWINGS

The reference numeral 10 indicates generally an agricultural tractor of which only a portion has been shown. The tractor is of the type to carry or pull large agricultural implements over and through fields. The present day combination tractor and implement is often very heavy and although it is usually equipped with a power steering mechanism it is still a tedious job for a driver to maintain that tractor-implement on a true course through the field whether it be for tilling, planting, cultivating or harvesting being done by the rig. As stated above it is the object of this invention to provide an aid to the driver in the routine steering along a row in a field. The invention comprises an attachment to the regular components of such a tractor.

The tractor 10 is provided with a longitudinally extending chassis 11 and a transversely disposed front wheel bolster 12. A forked bracket 13 depends from the underside of the forward end of the chassis 11 for the purpose of supporting the bolster 12 at its center. A longitudinally disposed pivot pin 14 passes through the forked bracket 13 and through the included bolster 12 and permits the bolster to have limited rocking movement in a transverse plane about the pin 14 as its pivot. This allows the steerable wheels to accommodate to variations in ground terrain. Axle housings 15 and 16 depend from the outer ends of the bolster 12. Laterally spaced apart front steerable wheels 17 and 18 are respectively mounted on the lower ends of the axle housings 15 and 16 respectively. A steering element 19, as best shown in FIG. 2, is disposed substantially centrally of the tractor and to the rear of the bolster 12. The steering element 19 is mounted (mounting not shown) for rotation or swinging movement in a horizontal plane by the usual tractor steering wheel and including hydraulic power steering mechanism. Links 20 and 21 have their inner ends pivotally mounted on the steering member 19. Te outer ends of the links 20 and 21 are pivotally attached respectively near the rearward ends of arms or link members 22 and 23. The arms 22 and 23 are affixed at their forward ends to the depending axle housings 15 and 16 respectively. Thus when the steering element 19 is rotated or swing, one of the two link arms 22 and 23 is pulled inwardly and the other is pushed a like distance outwardly causing the wheels 17 and 18 to be angularly positioned for a turning of the tractor.

An angle bracket 26 has a vertically disposed front wall 27 and a generally horizontally disposed rearwardly extending wall 28. The wall or side 28 is positioned generally centrally beneath the center of the bolster 12. The front vertical wall is affixed to and about the pivot pin 14 as best shown in FIGS. 1 and 3. This construction allows the bolster 12 to swing relatively to the forked bracket 13 and also the front wall 27 of the L-shaped bracket 26.

The auxiliary tractor guidance system of this invention is carried on the horizontal wall 28 of the angle bracket 26. This includes a box member 29 which consists of a top plate 30, a downwardly spaced apart bottom plate 31 and corner posts 32, 33, 34 and 35 which are located at the four corners of the vertically spaced apart top and bottom plates 30 and 31. The box is thus an open sided device which carries and houses the tractor steering assist mechanisms of this invention.

A pivot pin 36 passes vertically through aligned apertures in the horizontal wall 28 of the angle bracket 26 and the top plate 30 of the unitary open sided box 29. An enlarged top flange 37 is provided on the upper end of the pivot pin 36 and bears on the top side of the horizontal wall 28. Another enlarged flange 38 is provided on the lower end of the pivot pin 36 and is disposed on the underside of the top plate 30. This arrangement holds the box in a fixed vertical relationship with the horizontal wall 28 of the bracket 26 and makes it possible for the open sided box 29 to have relative rotational movement in a horizontal plane with respect to the horizontal wall 28 of the angle bracket 26. The spaced apart enlarged flanges 37 and 38 confine the pivot pin in its arrangement with these two elements 26 and 29.

Spaced apart hinge brackets 39 are integral with and project forwardly from the center of the top plate 30 of the open box 29. An elongated feeler member 40 has its upper rearward end pivotally mounted between the hinge brackets 39 and carried thereon by a transversely disposed hinge pin 41. The forward end 42 of the elongated feeler is curved upwardly and then slightly rearwardly in the manner of a sled runner. The feeler in its entirety is inclined downwardly and forwardly. The curved forward end 42 of the feeler 40 engages a ground trench 43. Undulations in the bottom of the trench 43 cause only an inconsequential raising or lowering of the feeler arm 40 about the hinge pin 41. However, when the tractor veers from the longitudinal path of the trench 43 the feeler hits one side or the other of the trench causing the feeler 40 to be swung to an angle relative to the tractor 10. This swinging of the feeler, because of the way it is attached to the open sided box 29, causes the box to swing a like amount about its pivot mounting 36. Although a ground trench has been shown as a preferred feeler engaging means it should be apparent that other field guiding means may be employed.

A vertically disposed pivot pin 44 is preferably in axial alignment with the pin 36 and is journally mounted for free rotation in the bottom plate 31 of the open box 29. Thus the pin or shaft 44 is located in substantially the center of the bottom plate 31. Vertically spaced apart collars or annular flanges 45 and 46 are provided on the shaft 44 in a manner so that the collar 45 is on the top surface of the bottom plate and the collar 46 is on the bottom side of the bottom plate 31. Hence the collars 45 and 46 flank the upper and lower surface of the bottom plate 31 and thereby confine movement of the shaft or pin 44 to one of rotation about its own vertical axis.

An arm 47 is affixed at its inner end to the pin or post 44 at a position spaced above the annular flange 45. An arcuately shaped quadrant is rigidly affixed to the outer end of the arm 47. The plane of the arm 47 and its quadrant 48 is generally parallel to and spaced above the bottom plate 31 of the open box 29. The construction is such that the vertically disposed pin 44 and its quadrant 48 move together as a unit. The quadrant 48 is equipped with an electro-magnetic field 49 which is arcuately shaped and is carried in a fixed position on the outside of the quadrant 48. It should be observed that the field 49 is of limited extent and does not fill the entire arcuate surface of the quadrant.

An arm 50 is affixed to the bottom of the pin or shaft 44 below the annular collar 46. The arm 50 projects rearwardly of the open box 29. Tie rods 51 and 52 are disposed generally transversely of the tractor and are connected at their inner ends by a pivotal attachment to the arm 50 at 53 and 54 respectively. The outer end of the tie rod 51 is pivotally attached at 55 to the rearward end of the arm 22. Similarly the tie rod 52 is pivotally attached at 56 to the rearward end of the arm 23.

Spaced apart, cylindrically shaped electro-magnetic switch members 57 and 58 are fixedly carried on the box 29 as best shown in FIG. 4. Each of the units 57 and 58 is disposed at an angle relative to the box and generally on radii of the vertical pin 44. Brackets 59 and 60 are employed to hold and support the switch members 57 and 58 respectively in fixed position on the bottom plate 31 of the box 29. The inner ends of the cylindrically shaped switch members 57 and 58 are disposed close to but slightly spaced from the quadrant 48. In normal position of the device the terminal endings 63 and 64 of the electro-magnetic field strip 49 are respectively preferably midway between each inner end 61 and 62 of the cylinder shaped switch members 57 and 58. It is important to note that upon relative rotation of the quadrant 48 and the box 29 one of the switch members 57 and 58 has its end surface extending over a greater portion of the electro-magnetic field 49 whereas the other of said switch members has its end surface disposed over a lesser portion of the electro-magnetic field or removed from direct contact with the field if the relative movement is great enough.

OPERATION OF THE DEVICE

Let us assume that a combination tractor and implement is being used to perform a function in a field relative to a crop. The field is a big one and it has been preliminarily fixed with grooves in the form of trenches either adjacent to or between rows where crop would be planted, tilled or harvested. These trenches will become rather permanent in the field and are used over and over again to aid in the guiding of a tractor mounted implement in the direction of the arrow as shown in FIG. 2 of the drawing along the path of that trench.

The feeler 40 has its upwardly curved forward and lower end 42 disposed in the trench 43. The operator merely holds the regular steering wheel of the tractor generally steady and is not concerned with making any direction corrections along the row to be travelled. The feeler takes over and automatically makes these minor steering corrections. This is accomplished by the feeler striking the side walls of the trench 43 if the tractor veers off course in either direction. The feeler may have arcuate shifting in the direction of the two ended arrow as shown in FIG. 1 of the drawing. This results in the open box 29 being rotated relative to the tractor whereupon the electro-magnetic switch members 57 and 58 shift relative to the quadrant. The electrical equipment is designed so the switch members 57 and 58 proportionately actuate the regular hydraulic steering mechanism to the degree the switch has direct association with the electro-magnetic field 49. One of the switches 57 and 58 is associated with each side of the regular steering mechanism so that upon the feeler causing relative arcuate shifting of the elements more hydraulic medium will be delivered to one side than the other thereupon causing the steering element to be rotated in a direction to cause the tractor steering to be corrected as necessary. Now, however, the tie rods 51 and 52 are affected by the corrective steering and they act to swing the arm 50 back to its normal position and this of course pulls the quadrant 48 back to normal relative to the switch members 57 and 58. Now in normal position as depicted in FIG. 4 both switches are calling for the delivery of an equal amount of hydraulic fluid to the steering device and there is no pulling or turning of the wheels one way or the other. The employment of the tie rods to return the device to its normal relationship of parts prevents a hunting and seeking process of the hydraulic steering system. This feature is indeed important as a tractor guidance system which tugs one way and then the other is of no help to the operator. The combination of proportioning switches with the quick returning tie rods is what makes the guidance system of this invention successful.

A modified form of feeler is depicted in FIG. 5 of the drawing and it should be apparent this feeler could be substituted for the feeler 40 as shown in FIGS. 1 and 2. The modified feeler 65 is provided with a hinge part 66 at its upper rearward end. This of course would cooperatively engage with the hinge elements 39 provided on the open box 29 as described above. The lower forward end of the modified feeler is bent downwardly and forwardly as shown at 67. A wheel 68 is journally carried for free rotation on the lower end of this forward portion 67. A W-shaped frame member 69 is attached, preferably by welding, to the underside of the main central portion of the feeler 65. The entire feeler 65 constitutes but a single plane with the wheel riding on the bottom of a prepared field trench 70 while the W frame bears against the side walls of the trench. The wheel 68 makes it easy for the tractor to push the feeler assembly forwardly through the trench and the W frame striking the side walls of the trench give instant response to off-veerings of the tractor resulting in quick reestablishment of proper tractor alignment along the field row as defined by the trench 70.

I am aware that numerous details of construction may be varied throughout a wide range without departing from the principles disclosed herein and I therefore do not propose limiting the patent granted hereon otherwise than as necessitated by the appended claims.

What is claimed is:

1. An auxiliary control for automatically guiding an agricultural tractor of the type having forwardly disposed steerable wheels and a power steering mechanism for turning said wheels in either direction, and the field over which the tractor is to be guided having feeler cooperating means, said auxiliary control comprising a frame structure journally mounted on a vertical axis on said tractor at a location adjacent the forwardly disposed steerable wheels, a feeler element, means mounting one end of the feeler element on said frame structure, the other free end of said feeler element engaging the feeler cooperating means in the field, whereby a guiding of the free end of the feeler element controls and effects rotation of the frame structure about its vertical axis, spaced apart electro-magnetic proportioning switches fixedly mounted on said frame structure, said electro-magnetic proportioning switches having operating ends arranged in spaced apart positions on an arcuate path, a vertically disposed shaft journally mounted for rotation in said frame structure, an arcuately shaped quadrant disposed within said frame structure and fixedly carried on said vertically disposed shaft, said arcuately shaped quadrant having a center common with the center of the arcuate path and concentrically disposed within said arcuate path, an electro-magnetic field means mounted on said arcuately shaped quadrant and being spaced radially inwardly of the operating ends of the electro-magnetic proportioning switches, said electro-magnetic field means having its spaced apart terminal endings disposed substantially midway of each operating end of the electro-magnetic proportioning switches, whereby relative movement of the quadrant with respect to the electro-magnetic proportioning switches causes the power steering mechanism to be operated in one direction or the other depending on which electro-magnetic proportioning switch has greater overlapping association with the electro-magnetic field means, linkage means joining said steerable wheels with said vertically disposed shaft and its quadrant whereby when the wheels are steered they cause a like rotation of the vertical shaft and the quadrant to quickly restore the normal relationship of the electro-magnetic proportioning switches with the electro-magnetic field means.

2. A device as set forth in claim 1 in which the means mounting one end of the feeler element on the frame structure comprises a hinge mounting limited to vertical swinging movement of the feeler element in a longitudinal plane.

3. A device as set forth in claim 1 in which the said linkage means comprises an arm movable with said quadrant and tie rods having their one ends pivotally mounted on said arm movable with the quadrant and their other ends pivotally joined for movement with the steerable wheels.

4. A device as set forth in claim 1 in which said feeler cooperating means is a trench.

5. A device as set forth in claim 4 in which said feeler element has a runner adapted to engage said trench.

6. A device as set forth in claim 4 in which said feeler element has a freely journalled wheel on its trench engaging end.

7. A device as set forth in claim 6 in which said feeler element further has a depending frame rearwardly of the freely journalled wheel for bearing against the side walls of the trench.

* * * * *